INVENTOR.
JOHN A. OELRICH
BY
Radford W Luther
ATTORNEY

United States Patent Office 3,521,535
Patented July 21, 1970

3,521,535
TIME MODULATED PNEUMATICALLY ACTUATED POSITION CONTROL MECHANISM
John A. Oelrich, Avon, Conn., assignor to Chandler Evans Inc., West Hartford, Conn., a corporation of Delaware
Filed Nov. 7, 1967, Ser. No. 681,130
Int. Cl. F15b *13/02, 13/16, 15/17*
U.S. Cl. 91—47                                          8 Claims

ABSTRACT OF THE DISCLOSURE

Control apparatus having a variable electrical error signal comprising the difference between the command input and load feedback signals, said error signal combined with a time referenced carrier signal to produce a time modulated output signal that is applied to the solenoid of a solenoid operated valve to produce a substantially non-fluctuating pneumatically generated control force that positions a compliant load.

BACKGROUND OF THE INVENTION

This invention pertains to a closed loop control system that positions the output load proportional to the magnitude of a command input signal. More particularly, this control system operates in response to an error signal, which is the difference between the command input signal and a load feedback signal, said error signal may be amplified before summation with a carrier signal to produce a time modulated input signal that is pneumatically converted into a force output, the magnitude of the force output being such as to position the load proportional to the command input signal. The invention concerns a control unit in which a time referenced carrier signal is combined with a suitably amplified variable electrical error signal to produce a time modulated electrical output signal of low energy level that is converted and pneumatically amplified to a substantially non-fluctuating force output of high energy level to continuously position an output load proportional to the magnitude of the command input signal.

The present invention has general application. However, as an example, it is utilized in guided missiles that have steering fins to guide the missile along a programmed or navigated flight path. In function the subject control mechanism performs similar to like closed loop position control systems known in the art and similarily utilizes a servo-actuator system that applies the intelligence received from the guidance system to produce within the design limits of the particular actuator system a force or torque output as a function of the error between input command and fin position to position the fin in response to the input command. As in other like control systems known in the art criteria on static and dynamic behavior and quality regarding system feedback and amplification or gain in relationship to system design pertain to this mechanism. The difference of the instant invention when compared with like control systems known in the art is the use of a simple non-linear servo-valve arrangement.

The principles employed in applying a simple non-linear valve configuration to quasi-continuous open loop torque proportional operation has been called time modulation and is described in detail for application to pneumatic devices in U.S. Pat. application Ser. No. 624,875 entitled "Time Modulated Pneumatically Actuated Control Mechanism" of inventor John A. Oelrich, filed Mar. 21, 1967, and as applied to hydraulic devices in U.S. patent application Ser. No. 624,902 entitled "Time Modulated Hydraulically Actuated Control Mechanism" of inventors John A. Oelrich and Joseph A. Andersen, filed Mar. 21, 1967, both of said applications assigned to the same assignee as the instant application, and both of said applications are hereby incorporated by reference for a detailed explanation of the principles of time modulation and the application of these principles to the operation of a torque balance control. The torque balance principle, as applied to control units used in conjunction with the steering fins of guided missiles, is described in detail in U.S. patent application Ser. No. 591,373 entitled "Control Mechanism" of inventor Jack O. Nash, filed Oct. 18, 1966, and assigned to the same assignee as the instant application and hereby incorporated by reference in this application.

The instant pneumatic force amplifying time modulated control mechanism invention is an extension of the above-referenced work from which various explanations will be extracted in whole or in part for clarity of presentation of position proportional operation.

SUMMARY OF THE INVENTION

This invention pertains to a closed loop servo-actuated pneumatically amplified position control mechanism that positions the output load element proportional to a feedback corrected input command signal.

A simple block diagram of a rudimentary closed loop position control system as may be applied to the subject concept is shown in FIG. 1. As indicated in the block diagram, the position of the load, $\theta$, may be electrically tranduced to a feedback signal, $E_p$, which is negatively summed with the input command, $E$, and the difference amplified by a pure gain, $G$, to create the error signal, $\epsilon$. Mathematically, the relationship for the error signal may be expressed as, $$\epsilon = (E - E_p)G \qquad (1)$$

where $E$ is proportional to the commanded position $\theta$ and $E_p$ is proportional to the actual or measured position of the load $\theta$ and their difference is the error in position accuracy. This relationship may first be reduced by stipulating, $$\frac{E}{E_{max.}} = \frac{\theta}{\theta_{max.}} = \bar{\theta} \qquad (2)$$

and $$\frac{E_p}{E_{max.}} = \frac{\theta p}{\theta_{max.}} = \bar{\theta}p \qquad (3)$$

where $E_{max}$ is the maximum electrical signal corresponding to the maximum commanded or measured position. For further simplicity of presentation, the frequency $f_c$ of the carrier will be assumed to be a fixed value triangular wave as shown in FIG. 2, and the half-amplitude of the carrier signal to be equal to $E_{max}$ so that the normalized error signal is, $$\bar{\epsilon} = \epsilon / E_{max} \qquad (4)$$

Substituting in Equation 1 we obtain:

$$\bar{\epsilon} = (\bar{\theta} - \bar{\theta}p)G \qquad (5)$$

where the gain $G$ retains its identity as a pure number.

Time modulation of the control organization of the instant invention is achieved by pulse actuation of the control system fluid transfer valve elements in response to the error signal $\epsilon$ such that the time integrated steady state effect produces a pressure or pressure differential that is substantially continuous and is proportional to the degree of modulation produced by the error signal $\epsilon$.

DESCRIPTION OF THE DRAWINGS

The following is a brief description of the drawings applicable to the instant invention.

Referring to FIG. 4, a carrier signal such as a triangular wave (shown by way of example) is supplied to a summing device 14 from a carrier signal generating device (not shown) well known in the art. The error signal $\epsilon$ is also supplied to the summing device. The carrier and error signals, by methods well known in the art, are summed in the summing device such that at a preselected single magnitude, called the threshold, the output signal of the summing device 14 is conveyed via conduits 30 and 31 to switch 29 to convey a signal via conduits 15 and 16 to cause a solenoid valve 8, shown in FIG. 4, to switch from the de-energized to the energized position.

It can be seen from FIG. 2a that the points of intersection of a projection of the threshold with the triangular shape carrier signal will produce a square wave switching curve. A duty cycle curve wherein the solenoid is energized exactly the same amount of time that it is de-energized produces a symmetrical square wave that, by definition, established the null or zero command level. At error commands other than zero, the solenoid will be in the energized or de-energized position for a longer or shorter portion of the time history, dependent upon the magnitude of the error signal $\epsilon$ received by the summing device. By way of illustration, a specific error signal $\epsilon$ and a triangular carrier signal at frequency $f_c$ are shown schematically in FIG. 2a. It can be seen that by projecting the points of intersection of error signal $\epsilon$ a specific duty cycle is produced. As shown in FIG. 2b, the time that the solenoid is energized $t_c$ is greater than the time the solenoid is de-energized $t_d$. The effect of this modulation of the carrier frequency, as shown by this illustrative example, is to produce a time integrated pressure whose magnitude is greater than the zero command level. Under such conditions the solenoid energized time $t_c$ during which gas is charged into the actuator is increased, while the de-energized time $t_d$ where gas is discharged from the actuator to ambient is proportionally decreased. From FIGS. 2a and 2b, and considering Equation 4 it can be shown that:

$$t_c = \frac{1}{2f_c}(1+\bar{\epsilon}) \qquad (6)$$

and $$t_d = \frac{1}{2f_c}(1-\bar{\epsilon}) \qquad (7)$$

Figure 1:
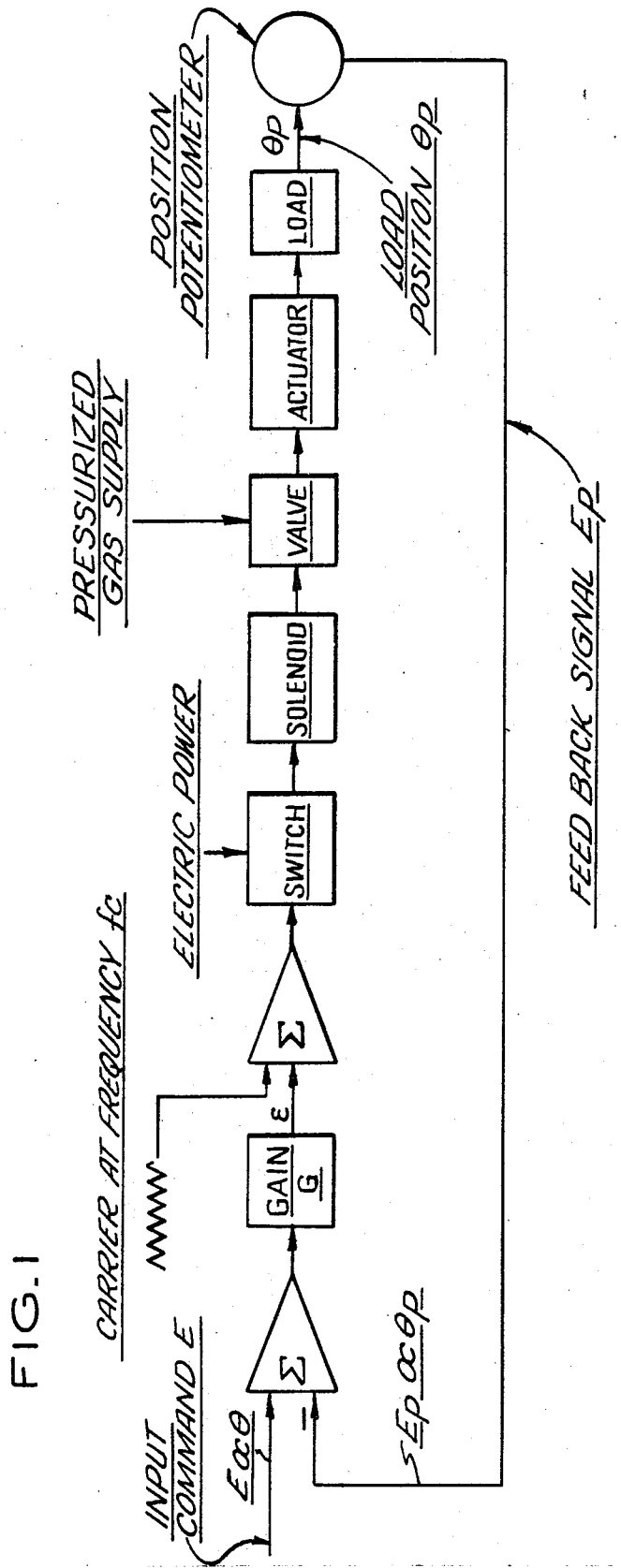
FIG. 1 is a generalized block diagram of one embodiment of the invention.

where, $$-1 = \bar{\epsilon} = 1 \qquad (8)$$

and the carrier frequency $f_c$ is in cycles per second.

Referring again to FIG. 4, the springs 90 and 91 represent the aerodynamic spring rate on the missile control surface 92 or fin associated with a given missile velocity, altitude, and other aerodynamic considerations. Since a missile during the course of its flight is subjected to varying aerodynamic conditions, the spring rate $k$ will, therefore, be variable. From FIG. 4 the static torque balance equation, assuming negligible friction, for the system shown can be expressed as:

$$(pA_{r1} - p_s A_{r2})l = k\theta p \qquad (9)$$

where:

$p$ = modulated pressure
$p_s$ = supply pressure
$A_{r1}$ = piston face area
$A_{r2}$ = piston face area
$l$ = length of lever arm
$\theta_p$ = fin angular displacement in relation to null.

By definition for the situation presented of a finite positive aerodynamic spring rate, the null or zero torque output position is represented by the condition where $\theta_p = 0$. Further, for the purposes of this illustration, it will be assumed throughout the discussion that the ambient pressure is negligible. To obtain equal bidirectional torque output of the actuator device shown in FIG. 4, it is necessary for the area ratio of the differential actuator piston to be 2:1. This assumed condition expressed in equation form is as follows:

$$A_{r1}/A_{r2} = 2 \qquad (10)$$

Substituting Equation 10 into 9, Equation 9 becomes:

$$\frac{p}{p_s} - \frac{1}{2} = \frac{k\theta p}{p_s A_{r1} l} \qquad (11)$$

It can be shown that the stall or maximum torque $T_s$ of the actuator is, $$T_s = p_s A_{r1} l / 2 \qquad (12)$$

Therefore, if we relate the spring rate $k$ such that, $$k = K \frac{T_s}{\theta_{max.}} \qquad (13)$$

Equation 11 becomes:

$$2p/p_s - 1 = K\bar{\theta}_p \qquad (14)$$

where $\bar{\theta}_p$ is the normalized output stroke as previously defined, and $K$ by definition of Equation 13 numerically defines the spring rate $k$ in factors of stall torque at maximum stroke. In actual operation of a physical system it is possible for $K$ to have negative as well as positive values.

Figure 4:
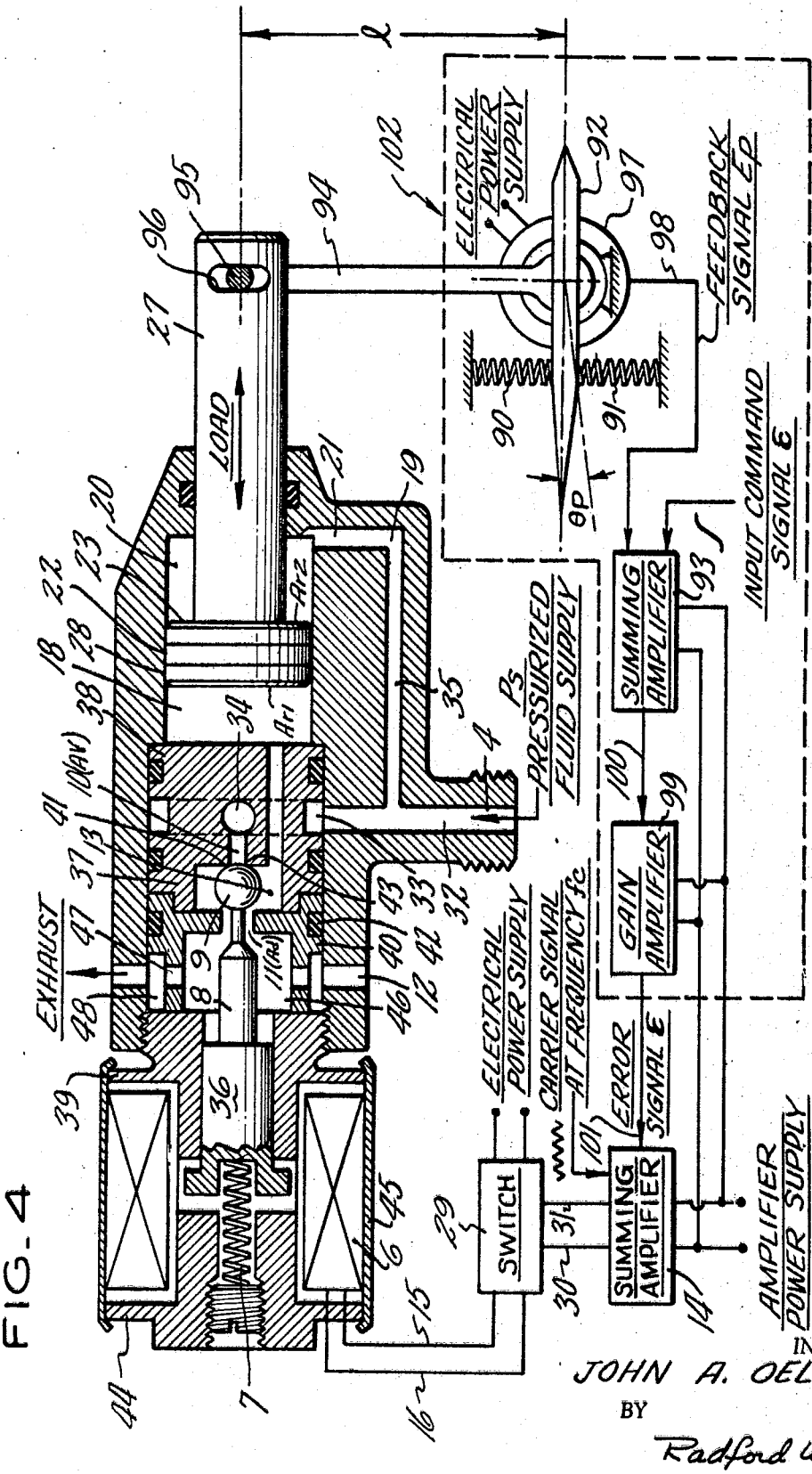
FIG. 4 is a schematic diagram partially in cross section showing the preferred embodiment of the instant invention.

Referring to FIG. 4, consider by way of example the condition where the error signal $\epsilon$ is zero, or by definition where the time $t_c$ equals the time $t_d$. For the ideal case, assume the time response for the electromechanical device 45 is zero such that upon the energization of the solenoid 6 the plunger 8 is retracted in opposition to the return spring 7 permitting the ball valve 9 to be urged into sealing engagement with orifice $A_d$, thus permitting the full physical inlet area $A_u$ to be available for the total charging time $t_c$, while the discharge port $A_d$ is closed. Conversely when the solenoid 6 is de-energized, the return spring 7 urges the ball valve 9 into sealing engagement with orifice $A_u$, thus closing orifice $A_u$ and opening the orifice area $A_d$ during the discharge time $t_d$. At very low values of carrier frequency $f_c$ and sufficiently large values of supply pressure, the actuator piston 28 would be fully extended during the charge cycle $t_c$, and would be fully retracted during the discharge cycle $t_d$. This mode of actuator operation is defined as the bang-bang control mode of operation.

If the carrier frequency $f_c$ is continuously increased, a frequency will be reached, depending upon the physical sizing of the control system and load, where the time during which fluid is introduced into the actuator chamber 18 is insufficient for a complete excursion of acutor piston 28 working in opposition to the system load. That is, the motion of the actuator piston 28 will be attenuated. Similarly, the same conditions of operation will prevail during the discharge cycle because of the reduced pressures in the actuator chamber. As the carrier frequency $f_c$ is further increased, the attenuation of the motion of the actuator piston 28 will be further increased, and at a sufficiently high carrier frequency the motion of the actuator piston 28 and the pressure variation in the actuator chamber 18 will be reduced to a acceptable magnitude. At this point, quasi steady-state conditions about a mean pressure $p_m$ prevail. That is, a substantially continuous mean pressure exists about which there is ideally a small perturbation. With the carrier signal frequency $f_c$ fixed at an acceptable value, as further discussed in the above-referenced application No. 624,875 of John A. Oelrich, filed Mar. 21, 1967, the mass of gas into the actuator during each cycle of the solenoid-valve must equal the mass of gas discharged to ambient for quasi steady-state conditions to exist. Due to the compressibility of the medium, flow through the inlet orifice $A_u$ will be either choked or unchoked depending on whether the pressure in the actuator is below or above the critical pressure. With a negligible ambient pressure relative to that in the actuator the discharge orifice $A_d$ may be assumed to always be choked. Therefore, two sets of equations are required to define mean equilibrium conditions both above and below the critical pressure ratio. When the pressure in the actuator is above the critical pressure, the flow through orifice $A_u$ is unchoked, whereas it is choked when gas is discharged through $A_d$. The mass in and out of the actuator per cycle of the valve may be expressed as follows:

$m$ in/cycle $$= \int_0^{t_c} \frac{CA_u(t)p_s}{\sqrt{T}} \sqrt{\frac{2g}{R}\frac{\partial}{\partial-1}\frac{p(t)}{p_s}^{\frac{1}{\partial}}} \sqrt{1-\frac{p(t)}{p_s}^{\frac{\partial-1}{\partial}}} dt \quad (15)$$

$$m \text{ out/cycle} = \int_0^{t_d} \frac{CC_f A_d(t) p(t)}{\sqrt{T}} dt \quad (16)$$

where:

$m$ = mass of gas
$C$ = coefficient of discharge
$A_u$ = area of inlet orifice
$A_d$ = area of discharge orifice
$T$ = absolute total temperature of gas
$g$ = constant of proportionality from Newton's Second Law of motion
$R$ = gas constant
$\partial$ = ratio of specific heats $$C_f = \sqrt{\frac{g\partial}{R}\left(\frac{2}{\partial+1}\right)^{\frac{\partial+1}{\partial-1}}}$$

The valve areas and the actuator pressure are in general functions of time as indicated in Equations 15 and 16 above. However, for the ideal case of a step valve and small pressure perturbations, the physical orifice areas $A_u$ and $A_d$ and a constant mean pressure, $p_m$, may be introduced into these equations. To further reduce the mathematical complexity, Equation 15 may be rewritten in what can be shown to be a close approximate form. This will be done assuming a hypothetical gas whose critical pressure ratio is 0.5 as a reasonable compromise between the most commonly used stored gases in missile controls, helium whose critical pressure ratio is about 0.489, and nitrogen whose critical pressure ratio is about 0.53, making these substitutions in Equations 15 and 16:

$$m \text{ in/cycle} = \int_0^{t_c} \frac{CC_f A_u P_s}{\sqrt{T}} 2\sqrt{\frac{p_m}{p_s}-\frac{(p_m)^2}{p_s}} dt \quad (17)$$

$$m \text{ out/cycle} = \int_0^{t_d} \frac{CC_f A_d p_m}{T} dt \quad (18)$$

Solving and equating Equations 17 and 18 for quasi steady-state conditions we obtain:

$$\frac{p_m}{p_s} = \frac{1}{1+\left(\frac{A_d}{2A_u}\frac{t_d}{t_c}\right)^2} \quad (19)$$

It must be remembered that Equation 19 is substantially valid only when the pressure ratio $p_m/p_s$ is above the assumed critical value of 0.5. When the pressure ratio is below 0.5, both orifices $A_u$ and $A_d$ are choked when in operation. For this case the mass of gas in and out of the actuator during a cycle of the solenoid-valve is as follows:

$$m \text{ in/cycle} = \int_0^{t_c} \frac{CC_f A_u(t)p_s}{\sqrt{T}} dt \quad (20)$$

$$m \text{ out/cycle} = \int_0^{t_d} \frac{CC_f A_d(t)p(t)}{\sqrt{T}} dt \quad (21)$$

Applying the previously used assumptions, solving, and equating as a condition of continuity, the quasi steady-state pressure ratio in this region is:

$$\frac{p_m}{p_s} = \frac{A_u}{A_d}\frac{t_c}{t_d} \quad (22)$$

As previously indicated, it is generally convenient and useful to make the 50 percent duty cycle of the solenoid-valve where the charging time $t_c$ equals the discharging time $t_d$ corresponds with null or zero error signal and hence zero torque output. Referring to Equation 14 and specifying $\bar{\theta}=0$ (or $K=0$) for zero torque, it is found that the required null pressure ratio is, $$\left(\frac{p_m}{p_s}\right)_{null} = .5 \quad (23)$$

In this case null pressure ratio refers only to zero torque since either $\bar{\theta}_p$ or $K$ or both may be zero. Substituting this value of the pressure ratio along with $t_c = t_d$ into either Equation 19 or 22 results in the required valve area ratio for the example presented:

$$A_d/A_u = 2.0 \quad (24)$$

Substituting Equation 24 for the area ratio and Equations 6 and 7 for $t_c$ and $t_d$ respectively in Equations 19 and 22 finally relates the pressure ratio to the error signal in the two flow regimes. For the case where $$.5 \leq \frac{p_m}{p_s} \leq 1 \quad (25)$$

that is, where, $$0 \leq \bar{\epsilon} \leq 1 \quad (26)$$

the pressure ratio is expressed as:

$$\frac{p_m}{p_s} = \frac{1}{1+\left(\frac{1-\bar{\epsilon}}{1+\bar{\epsilon}}\right)^2} \quad (27)$$

When the pressure ratio is in the range, $$0 \leq \frac{p_m}{p_s} \leq .5 \quad (28)$$

or when, $$-1 \leq \bar{\epsilon} \leq 0 \quad (29)$$

the expression is:

$$\frac{p_m}{p_s} = .5\frac{1+\bar{\epsilon}}{1-\bar{\epsilon}} \quad (30)$$

Equations 27 and 30 when appropriately combined with Equation 14 may be used to define the open loop static performance of a torque balance system as discussed in detail in the above-referenced application No. 624,875 of John A. Oelrich, filed Mar. 21, 1967. For the case of the torque balance system, the output position feedback signal $E_p$ is removed from FIG. 1 and the gain $G$ is made numerically equal to 1. The error signal $\bar{\epsilon}$ is then equivalent to the normalized input command signal $E/E_{max}$, and by inspection of Equations 27 and 30 in conjunction with Equation 14, it can be seen that the output actuator torque, for positive valves of spring rate $k$, is proportional to input command $E$ within the normal capabilities of the mechanism.

Having obtained relationships for the pressure ratio, it is now possible to develop expressions for the approximate closed loop performance of the system presented by combining Equations 5 and 14 with Equations 27 and 30. Substituting Equation 5 into 27 for the error signal ε and the result into Equation 14 for $p_m/p_s$ and solving for the normalized commanded position:

$$\bar{\theta} = \bar{\theta}_p + \frac{1}{G} \frac{1 - \sqrt{\frac{1-K\bar{\theta}_p}{1+K\bar{\theta}_p}}}{1 + \sqrt{\frac{1-K\bar{\theta}_p}{1+K\bar{\theta}_p}}} \qquad (31)$$

To satisfy the conditions previously stipulated, Equation 31 for positive values of spring rate factor K, applies to only positive values of $\bar{\theta}_p$, that is, to the extension of the actuator when the pressure ratio is above 0.5. For the retract direction of the actuator, that is, for negative values of $\bar{\theta}_p$ and corresponding pressure ratios below 0.5, the appropriate expression is obtained by substituting Equation 5 into 30 and the result into Equation 14. The solution is:

$$\bar{\theta} = \bar{\theta}_p + \frac{1}{G} \frac{K\bar{\theta}_p}{K\bar{\theta}_p + 2} \qquad (32)$$

Figure 3:
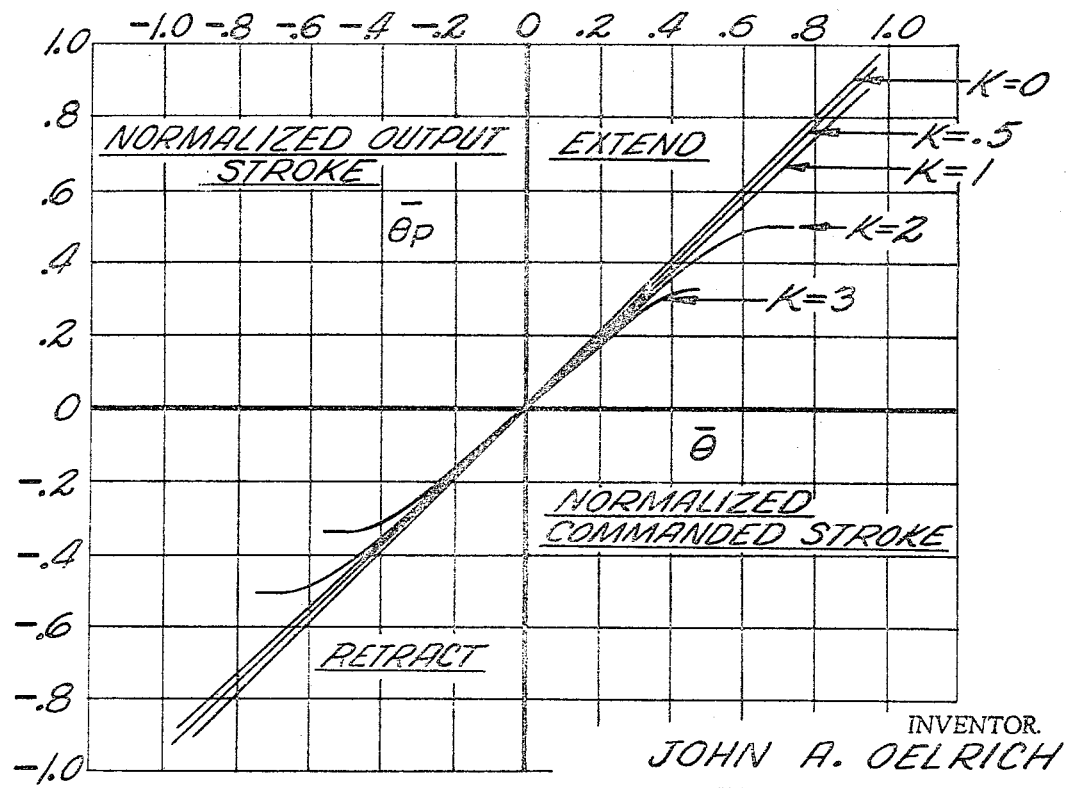

Equations 31 and 32 are plotted in FIG. 3 for an arbitrarily selected gain value of $G=10$ for various positive spring rate factors K. It can be reasoned that for negative values of the spring rate factor K, the roles of Equations 31 and 32 reverse, Equation 31 applying to the retract direction with negative values of $\theta_p$ and Equation 32 applying to the extend direction with positive values of $\bar{\theta}_p$.

Referring now to the drawings wherein like characters are used throughout to designate like elements, and more specifically to FIG. 4 wherein is shown generally at 93 a summing amplifier, said summing amplifier being well known in the art. Said summing amplifier 93 is supplied with a source of amplification power from an appropriate power supply, not shown, said power entering said power amplifier 93 where an appropriate control input signal and feedback signal $E_p$ are simultaneously fed into said summing amplifier 93 from an appropriate control surface position indicator feedback potentiometer 97 and an appropriate control device, respectively. Control surface or control element 92 is fixedly secured to arm 94 and pivot pin 95. Pivot pin 95 slideably engages slot 96 of output actuator arm 27 such that bidirectional axial movement of arm 27 produces a corresponding angular displacement of control surface 92. Position potentiometer 97 is fixedly secured to control surface 92 and connected to an appropriate source of electrical power such that each finite angular displacement $\theta_p$ of control surface 92 produces a finite feedback signal $E_p$ that is transmitted via conduit 98 to summing amplifier 93. Said summing amplifier 93 combines said input command signal E and said feedback signal $E_p$ to produce a single output error signal ε that is a composite of the command input signal and the feedback signal. The error signal ε is fed into a gain amplifier 99 via conduit 100 where the power of said error signal ε is increased and is then conducted via conduit 101 to summing amplifier 14. Said summing amplifier 14 is supplied with a source of amplification power from an appropriate power supply, not shown, said power enters said power amplifier 14 where an appropriate carrier signal and an amplified error signal are simultaneously fed into said summing amplifier 14 from an appropriate carrier signal generator, not shown, and a position feedback organization 102 outlined generally in FIG. 4. Said summing amplifier unit 14 combines said carrier signal and said error signal to produce a single output signal that is a composite of said carrier signal and said input signal. The composite output signal of said summing amplifier 14 is transmitted to electrical switch 29 by means of electrical conduits 30 and 31. Electrical switch 29 is supplied with a source of electrical power from an appropriate power supply, not shown. Said power enters electrical switch 29 and upon receipt by electrical switch 29 of a composite signal from summing amplifier 14 via interconnecting conduits 30 and 31, said electrical power supply is communicated through switch 29 to solenoid 6 via electrical conduits 15 and 16.

Figure 2:
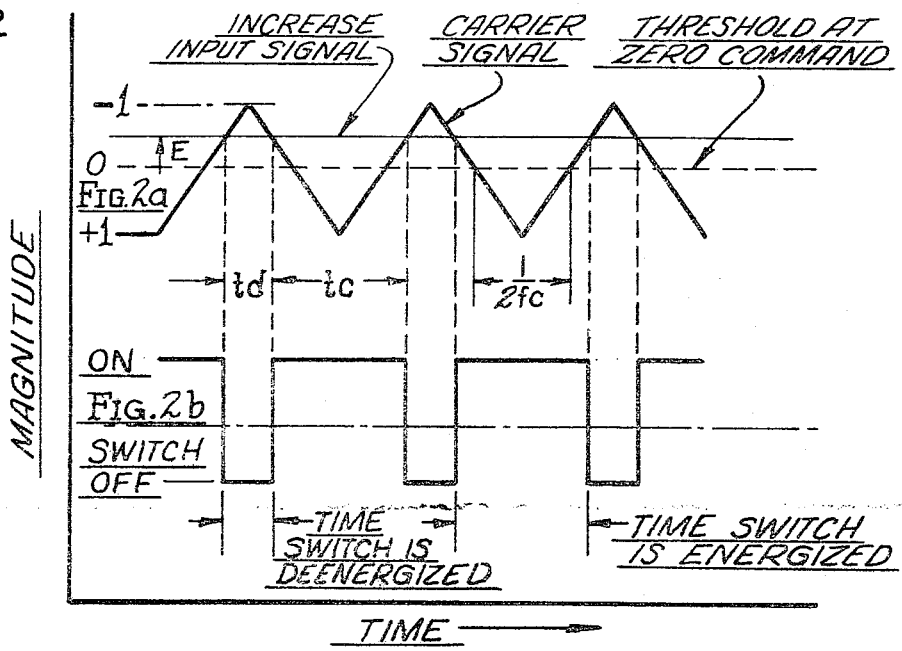
FIGS. 2a, 2b and 3 are diagrams of certain operating characteristics of the control device shown in FIG. 4.

The operation of electrical switch 29 is such that the switch closes upon receipt of a signal whose magnitude is equal to the threshold level, or above, as shown in FIG. 2a, and conversely the switch opens when the signal level drops below the threshold value. Thus, the action of switch 29 is to supply power to solenoid 6 via conduits 15 and 16 in an on-off or step function mode of operation. The frequency of the power pulses received by solenoid 6 from the electrical power source through switch 29 being dependent upon the frequency of the carrier signal, and the duration of the pulses being dependent upon the modulation of the carrier signal provided by the magnitude of the error signal E.

Referring again to FIG. 4, pressurized fluid from a suitable pressurized fluid supply, not shown, is conducted to conduit 4 of actuator housing 21. Said pressurized fluid is conducted to orifice 10 via conduit 32 and interconnecting annulus 33 and passageway 34. Similarly, said pressurized fluid is simultaneously conducted from conduit 4 to pressurized chamber 20 via interconnecting conduit 35. Valve housing 37 is mounted in a bore in piston housing 21 and is positioned in said piston housing 21 by shoulder 38. Solenoid housing 39 is positioned in bore 40 of piston housing 21 and threadably engages piston housing 21 such that valve housing 37 and solenoid housing 39 are secured in a fixed relation to piston housing 21 by means of shoulder 38 and the threaded engagement of solenoid housing 39 into the bore 40 of housing 21. When solenoid 6 is energized by means of an appropriate signal from switch 29 via conduits 15 and 16, guide 36 and plunger 8 fixedly secured to guide 36 are retracted compressing spring 7. Upon the retraction of plunger 8, ball 9 moves from sealing engagement with valve seat 41 to sealing engagement with valve seat 42 by means of the constant pressure present in chamber 43 in fluid communication with orifice 10, passageway 34, annulus 33 and conduit 32. The retraction of ball 9 permits fluid to flow through orifice 10 and thence through interconnecting chambers 43, 13, 5 and into chamber 18. Conversely, when solenoid 6 is deenergized, spring 7 retained by cap 44 secured to solenoid housing 39 by retaining sleeve 45 urges guide 36 and plunger 8 into engagement with ball 9 to sealably engage ball seat 41 while simultaneously connecting chamber 18 to ambient exhaust port 12 via conduit 5, chamber 13, exhaust orifice 11, chamber 46, port 47 and annulus 48. By way of example, if the ratio of exhaust area 11 to inlet area 10 is fixed at .5, and the dynamic movement of ball 9 between valve seats 41 and 42 is such as to establish a quasi steady-state condition, then the magnitude of the pressure in chamber 18 will be $.5p_s$ at the quasi steady-state null condition, provided actuator piston 28 is a half area piston, as described herein.

The area of piston 28 subjected to constant supply pressure $p_s$ via interconnecting port 19, passageway 35 and conduit 4 is one-half the area of the opposite side of said output piston 28 subjected to the modulated supply pressure of chamber 18. Thus, when a pressure of magnitude exactly $.5p_s$ is impressed upon the larger area of output piston 28 and a quasi steady-state condition exists, a null condition of output piston 28 exists. The modulation of the carrier signal by the error signal ε can result in a modulated pressure in chamber 18 less than $.5p_s$ such that axial motion of output piston 28 to the left results; conversely, the carrier signal can be modulated to produce a modulated pressure in chamber 18 that is greater than $.5p_s$, thus causing actuator piston 28 to move to the right. Hence, the magnitude of the error signal modulates the carrier signal to produce bidirectional movement of the actuator piston dependent upon the degree of modulation.

What has been shown in idealized approximate form is the fundamental mean static performance of a pneumatic time modulated system in the closed loop position mode. It can be reasoned that since a pressure perturbation exists, a load dither may be superposed on the performance derived at a frequency equal to the carrier frequency $f_c$, the amplitude of the load dither depending on the selection of the carrier frequency $f_c$ and the relative design and operating parameters of the control system and load. The range of frequencies from which a suitable carrier frequency may be selected for a given application is discussed in detail in the above-referenced application No. 624,875 of John A. Oelrich, filed Mar. 21, 1967, and the principles enunciated there are applicable to the instant mode of operation. As indicated in said application No. 624,875, a dither amplitude range generally exists at a fixed carrier frequency which is primarily a function of the pneumatic time constant of the actuator, which varies with actuator motion and gas characteristics, and the impedance of the load. As discussed, in certain applications a degree of dither is beneficial in reducing the effect of friction on resolution.

Figure 5:
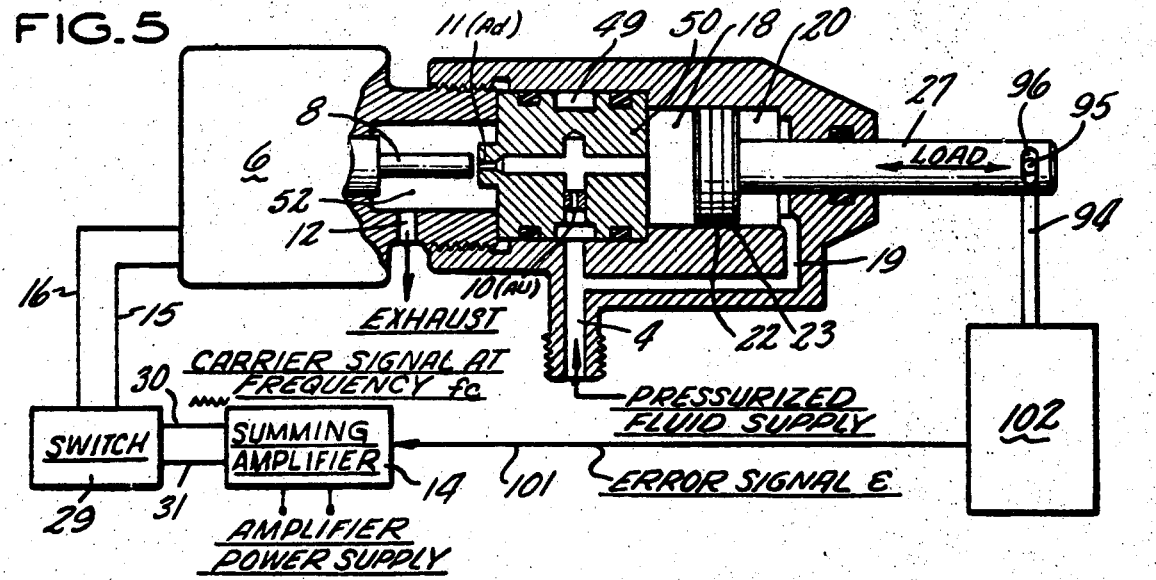
FIG. 5 is a schematic diagram partially in cross section of a control mechanism showing an alternate embodiment of the instant invention.

FIG. 5 showns an alternate adaptation of the time modulated control embodiment wherein a fixed inlet orifice and a variable discharge orifice is utilized.

Referring to FIG. 5 wherein is shown generally at 14 and 29 a summing amplifier and electrical switching arrangement whose operation is the same as that described herein for the organization shown in FIG. 4. Similarly, a conventional half area servo is shown by piston 28, housing 21 and pressurized fluid chambers 18 and 20 whose operation is precisely the same as that described in detail herein for FIG. 4. Pressurized fluid is conducted from conduit 4 to annulus 49 of spacer 50. Said pressurized fluid is thence conducted through fixed orifice 10 to interconnecting passage 51 and thence simultaneously to pressured chamber 18 and variable orifice 11. Upon the energization of solenoid 6, plunger 8 moves into sealing engagement with discharge orifice 11. When solenoid valve 6 is de-energized, a spring (not shown) urges plunger 8 away from sealing engagement with variable orifice 11. Thus, when plunger 8 is retracted, pressurized fluid passes into chamber 52 and thence through exhaust port 12 to atmosphere. When plunger 8 is in sealing engagement with orifice 11, the flow of fluid through orifice 11 is stopped and pressurized fluid passes only into chamber 18 via fixed orifice 10 and interconnecting conduit 51.

The idealized approximate indication of the ability of the organization shown in FIG. 5 to modulate as a position control in the closed loop mode is somewhat different from that described in detail for the valve embodiment of FIG. 4 and described in detail for the analysis of the organization in FIG. 4. When the system pressure ratio is below the assumed critical value of 0.5, the mass of gas in and out of the actuator volume during each cycle of the valve is as follows:

$$m \text{ in/cycle} = \int_0^{t_c} \frac{CC_f p_s A_u}{\sqrt{T}} dt \quad (33)$$

$$m \text{ out/cycle} = \int_0^{t_d} \frac{CC_f p(t) A_u(t)}{\sqrt{T}} dt - \int_0^{t_d} \frac{CC_f p_s A_u}{\sqrt{T}} dt \quad (34)$$

With a step valve and small pressure perturbations, equating Equations 33 and 34 results in:

$$\frac{p_m}{p_s} = \frac{A_u}{A_d} \left( \frac{t_c + t_d}{t_d} \right) \quad (35)$$

For the null condition $t_c = t_d$ at zero error signal $\epsilon$ and the required zero torque pressure ratio of .5, the necessary valve area ratio from Equation 35 is:

$$A_d / A_u = 4 \quad (36)$$

It will be found that with this valve-actuator configuration equal bidirectional torque is not produced since the minimum pressure ratio is .25, not zero.

At system pressure ratios above 0.5 the mass of gas in and out of the actuator per valve cycle may be expressed as:

$$m \text{ in/cycle} = \int_0^{t_c} \frac{CC_f p_s A_u}{\sqrt{T}} 2\sqrt{\frac{p(t)}{p_s} - \left(\frac{p(t)}{p_s}\right)^2} dt \quad (37)$$

$$m \text{ out/cycle} = \int_0^{t_d} \frac{CC_f p(t) A_d(t)}{\sqrt{T}} dt$$

$$- \int_0^{t_d} \frac{CC_f p_s A_u}{\sqrt{T}} 2\sqrt{\frac{p(t)}{p_s} - \left(\frac{p(t)}{p_s}\right)^2} dt \quad (38)$$

The solution to these equations at quasi steady-state conditions is:

$$\frac{p_m}{y_s} = \frac{1}{1 + \left(\frac{A_d}{2A_u} \frac{t_d}{t_c + t_d}\right)} \quad (39)$$

Substituting Equation 36 for the valve area ratio, Equations 6 and 7 for $t_c$ and $t_d$ respectively, and employing Equation 5 for the error signal $\bar{\epsilon}$ transforms Equations 35 and 39 to the desired final result. For conditions here:

$$0 \leq \frac{p_m}{p_s} \leq .5 \quad (40)$$

or, correspondingly, $$-1 \leq \bar{\epsilon} \leq 0 \quad (41)$$

the commanded position is related to the output position of the load as follows:

$$\bar{\theta} = \bar{\theta} p + \frac{1}{G} \frac{K \bar{\theta} p}{K \bar{\theta} p + 1} \quad (42)$$

For positive values of spring factor K, Equation 42 applies to actuator retraction with negative values of $\bar{\theta}_p$. With negative values of spring factor K, Equation 42 applies to extension of the actuator and positive values of $\bar{\theta}_p$.

For conditions where:

$$.5 \leq \frac{p}{p_s} \leq 1 \quad (43)$$

with corresponding values, $$0 \leq \bar{\epsilon} \leq 1 \quad (44)$$

the expression is:

$$\bar{\theta} = \bar{\theta} p + \frac{1}{G}\left[1 - \sqrt{\frac{1 - K \bar{\theta}_p}{1 + K \bar{\theta}_p}}\right] \quad (45)$$

Equation 45 applies normally to extension of the actuator with positive $\bar{\theta}_p$ but with negative spring rate factors pertains to retraction with negative output position.

Figure 6:
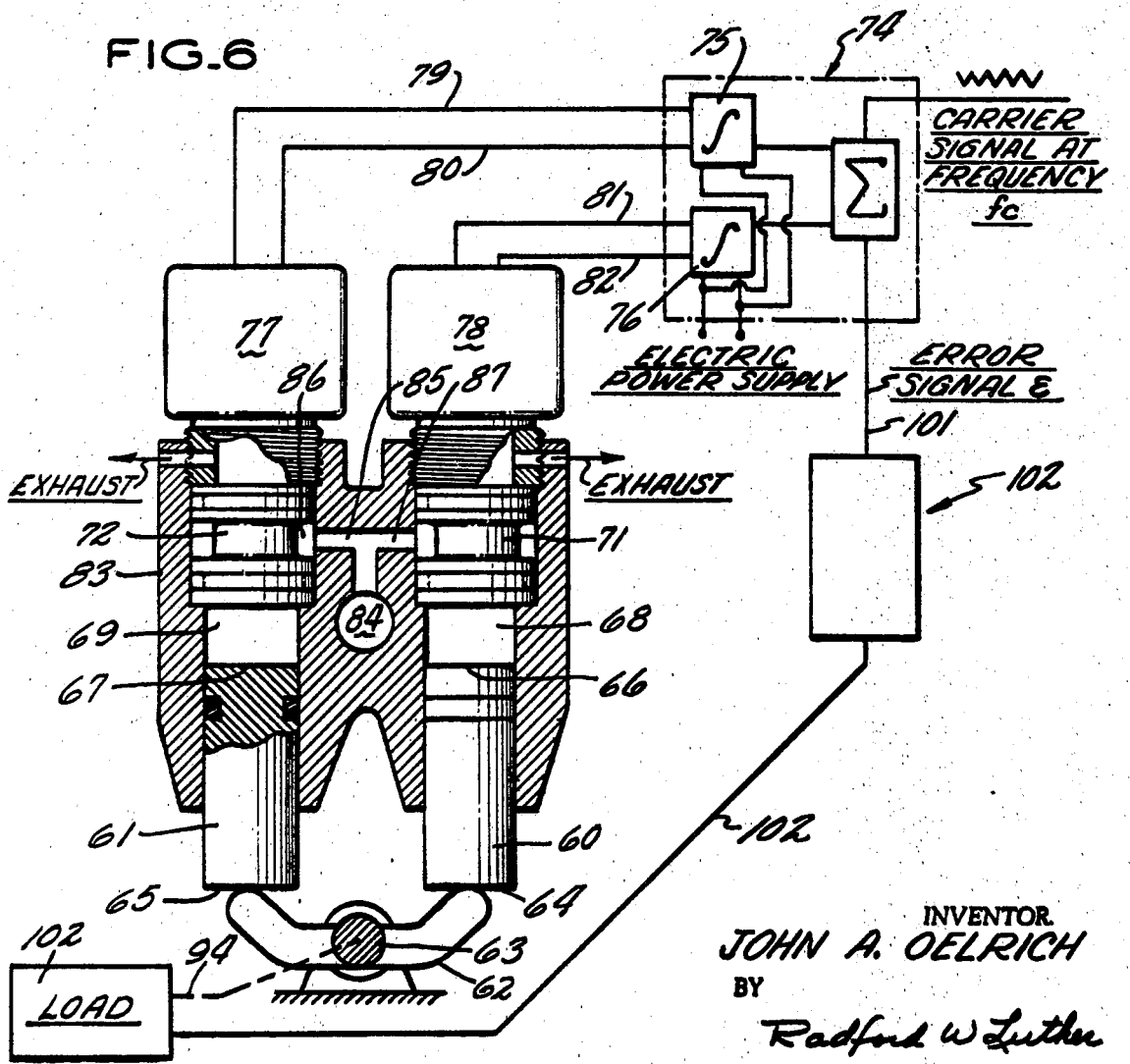
FIG. 6 is a schematic diagram partially in cross section showing a second alternate embodiment of the instant invention.

Another alternate arrangement shown in FIG. 6 utilizes two solenoid-valve-actuator assemblies in juxtaposed relationship to form a so-called push-push arrangement. In the push-push configuration, two actuator assemblies each having a single actuator piston 60 and 61 disposed therein with the axes of their respective actuator pistons parallel to each other, engage opposite ends of a center mounted torque arm arrangement 62. The torque arm is fixedly attached at its center to a rotatably mounted actuator shaft 63, the axis 70 of said actuator shaft being transverse a plane in which the opposite ends of said rocker arm are positioned. The opposite ends of said rocker arm 62 each engage one end of separate actuator pistons 60 and 61 of the respective juxtaposed actuator assemblies at points 64 and 65. The other end of each of said separate actuator pistons 60 and 61 has an equal area 66 and 67 exposed to pressurized fluid. The actuator assemblies are so constructed that pressurized fluid is conducted to only the one end 66 and 67 of each piston. Thus, when equal pressure is present in chambers 68 and 69 and is exerted on the ends 66 and 67 both pistons 60 and 61, each of said pistons produces an equal force which is transmitted to its respective point of engagement 64 and 65 with its half of said torque arm such that an equal but opposite torque is produced by the two halves of the rocker arm. This equal but opposite torque condition produces an equalibrium or null condition about the rotative axis of said actuator shaft. A time modulated fluid transfer mechanism shown generally at 71 and 72 of either the two fixed orifices in series or the single fixed orifice with the second variable area orifice, both described in detail hereinabove, can be utilized to supply a time modulated pressure to the pressurized end of each of said actuator pistons.

The input circuit shown generally at 74 and 102 is similar to the feedback and switching arrangement described in detail for FIG. 4 herein. However, two electrical switches 75 and 76 each similar in operation to switch 29 described in FIG. 4 are used. Electrical switches 75 and 76 differ from each other in operation in that one switch is energized at a signal whose magnitude is greater than the threshold value, while the other switch is de-energized when a signal of similar magnitude is impressed thereon. Switch 75 energizes solenoid 77 via conduits 79 and 80, and switch 76 energizes solenoid 78 via conduits 81 and 82. Solenoids 77 and 78 are threadably secured to housing 83 and operatively engage fluid transfer mechanisms 71 and 72. Pressurized fluid is simultaneously supplied to chambers 68 and 69 from a source of pressurized gas 84 via interconnected passageways 85, 86 and 87. Either of the two time modulated fluid transfer organizations are operationally connected to the juxtaposed actuator pistons via chambers 68 and 69 such that the pressure in the chamber of one piston increases from the null position, while the pressure in the other chamber decreases. Thus, for a variation in input control signal, the force output of the two pistons varies from a zero or null position to produce either an increased or decreased force output such that either clockwise or counterclockwise rotation of the actuator shaft 63 and its integrally connected reactive load shown schematically at 73 is produced; dependent upon the magnitude of the input command signal with respect to the zero or null value. Some of the potential advantages of this so-called push-push system are that a more linear input-output relationship is possible, coupled with the elimination of backlash by the use of a substantially constant force on the rocker arm.

While the preferred embodiments of the invention have been shown, it is to be understood that this invention is not limited to the precise construction and arrangement of elements disclosed by way of illustration, since these may be changed and modified by those skilled in the art without departing from the spirit of the invention.

What I claim is:

1. A closed loop control mechanism comprising, an input command signal, a carrier signal source, a source of pressurized fluid in communication with an actuator, an output member responsive to movements of said actuator, a control element operatively connected to said output member, fluid transfer means having at least one chamber receiving said pressurized fluid, means operatively associated with said output member and said input command signal to generate an error signal proportional to the position of said output member, summing amplifier means to receive said error signal and a carrier signal generated by said carrier signal source, threshold sensing switch means connected to the output of said summing amplifier means to effect at least one time modulated output signal, said fluid transfer means responsive to signals from said switch means to vary the pressure in said chamber to effect a substantially non-pulsating finite pressure for each finite input command signal and said substantially non-pulsating finite pressure being communicated to said actuator such that each position of said control element is proportional to a finite value of said input command signal.

2. A control mechanism, as described in claim 1, wherein said pressurized fluid is a gas.

3. A control mechanism, as described in claim 2, wherein said fluid transfer means comprises a solenoid operated member actuable by said switch means.

4. A closed loop position control mechanism including an input command signal, a carrier signal, a source of pressurized fluid, an actuator, an output member and a control element operatively associated with said output member comprising, fluid transfer means having at least one chamber receiving said pressurized fluid, means operatively associated with said output member and said input command signal to generate an error signal proportional to the position of said output member, means adapted to receive said error signal and said carrier signal to effect at least one time modulated output signal, said fluid transfer means constructed and arranged to vary the pressure in said chamber such that a substantially non-pulsating finite pressure is communicated to said actuator to thereby control said actuator such that each position of said control element is proportional to a finite value of said input command signal, said means operatively associated with said output member and said input command signal comprising a potentiometer fixedly secured to said control element, said potentiometer so constructed to produce a feedback output signal proportional to the actual position of said output member, summing means combining said feedback signal and said input command signal such that an output error signal proportional to control element position is generated and transmitted to said time modulating means, said fluid transfer means comprising a solenoid operated valve having, an inlet and an outlet and a chamber intermediate said inlet and outlet with said source of pressurized fluid connected to said inlet, and having said solenoid energized by said time modulated output signal at a frequency greater than the critical frequency of said control mechanism to thereby generate a substantially non-pulsating output pressure, wherein said output pressure is communicated to said actuator to move said actuator such that each position of said control element is proportional to a corresponding input command signal.

5. A closed loop position control mechanism including an input command signal, a carrier signal, a source of pressurized fluid, an actuator, an output member and a control element operatively associated with said output member comprising, fluid transfer means having at least one chamber receiving said pressurized fluid, means operatively associated with said output member and said input command signal to generate an error signal proportional to the position of said output member, means adapted to receive said error signal and said carrier signal to effect at least one time modulated output signal, said fluid transfer means constructed and arranged to vary the pressure in said chamber such that a substantially non-pulsating finite pressure is communicated to said actuator to thereby control said actuator such that each position of said control element is proportional to a finite value of said input command signal, said means operatively associated with said output member and said input command signal comprising a potentiometer fixedly secured to said control element, said potentiometer so constructed to produce a feedback output signal proportional to the actual position of said output member, summing means combining said feedback signal and said input command signal such that an output error signal proportional to control element position is generated and transmitted to said time modulating means, said fluid transfer means comprising a housing having a fixed inlet orifice supplying said source of pressurized fluid to said housing, an outlet passage discharging fluid from said housing and a solenoid operated member mounted adjacent said outlet passage and having said solenoid energized by said time modulated output signal at a frequency greater than the critical frequency of said control mechanism to thereby generate a substantially non-pulsating output pressure wherein said output pressure is communicated to said actuator to move said actuator such that each position of said control element is proportional to a corresponding input command signal.

6. A closed loop position control mechanism including an input command signal, a carrier signal, a source of pressurized fluid, an actuator, an output member and a control element operatively associated with said output member comprising, fluid transfer means having at least one chamber receiving said pressurized fluid, means operatively associated with said output member and said input command signal to generate an error signal proportional to the position of said output member, means adapted to receive said error signal and said carrier signal to effect at least one time modulated output signal, said fluid transfer means constructed and arranged to vary the pressure in said chamber such that a substantially non-pulsating finite pressure is communicated to said actuator to thereby control said actuator such that each position of said control element is proportional to a finite value of said input command signal, said means operatively associated with said output member and said input command signal comprising a potentiometer fixedly secured to said control element, said potentiometer so constructed to produce a feedback output signal proportional to the actual position of said output member, summing means combining said feedback signal and said input command signal such that an output error signal proportional to control element position is generated and transmitted to said time modulating means, said fluid transfer means comprising first and second pistons positioned to engage respectively the opposite ends of a rocker arm such that separate chambers are in separate fluid communication with each of said pistons, each of said separate chambers having a solenoid operated member associated therewith such that each chamber alternately receives a substantially non-pulsating fluid pressure generated by said solenoid operated member responsive to said time modulated output signal such that each position of said control element is proportional to a corresponding input command signal.

7. A pneumatically operated time modulated position control mechanism comprising a source of compressible fluid under pressure and a housing for receiving said fluid, said housing being provided with a chamber with an actuator piston disposed slidably therein dividing said chamber into two smaller chambers, a conduit in said housing for directing said fluid into one of said smaller chambers and a passageway within said housing for directing said fluid into the other of said two smaller chambers, a solenoid operated valve for controlling said fluid within said passageway to control the pressure within said other smaller chamber, said actuator piston connected to an output member, said output member being interconnected to a control element, means operatively connected to said control element to generate a feedback signal proportional to the position of said control element, means receiving said feedback signal and an input command signal to generate an output error signal proportional to control element position, summing amplifier means to combine said output error signal and a carrier signal, said amplifier means connected to a threshold sensing switch means at the output of the amplifier means to generate a time modulated signal to said solenoid operated valve for control of the pressure within said other smaller chamber whereby the position of said control element will be responsive to pressure variations in said other smaller chamber such that each position of said control element is proportional to a finite magnitude of the input command signal.

8. A pressure responsive control mechanism comprising an input command signal, a carrier signal source, a source of pressurized fluid in communication with juxtaposed actuator assemblies, a rotatably mounted rocker arm engaging said actuator assemblies, an actuator shaft mounted on said rocker arm for rotational movement therewith, fluid transfer means having two chambers communicating with respective actuator assemblies, receiving said pressurized fluid, means operatively associated with said actuator shaft and said input command signal to generate an error signal proportional to the position of said actuator shaft, means to receive said error signal and a carrier signal from said signal source, to effect at least one time modulated output signal, said fluid transfer means varying the pressure in said chambers to produce a substantially non-pulsating finite pressure for each finite input command signal, and means to produce a pressure differential between the two chambers to rotate said rocker arm for positioning said actuator shaft proportional to a finite value of said input command signal whereby a push-push operation is possible.

References Cited

UNITED STATES PATENTS

| | | | |
|---|---|---|---|
| 3,015,314 | 1/1962 | Strader | 911—417 |
| 3,131,340 | 4/1964 | Johnson et al. | 318—20.480 |
| 3,257,912 | 6/1966 | Vander Horst | 91—417 |
| 3,260,912 | 7/1966 | Gregory | 318—20.480 |
| 3,295,421 | 1/1967 | McCormick | 91—363 |

PAUL E. MASLOUSKY, Primary Examiner

U.S. Cl. X.R.

91—186, 361, 417